US009246671B2

(12) United States Patent
Brahner et al.

(10) Patent No.: US 9,246,671 B2
(45) Date of Patent: Jan. 26, 2016

(54) MOTOR VEHICLE WITH ENCRYPTED BUS DATA

(71) Applicant: AUDI AG, Ingolstadt (DE)

(72) Inventors: Tom Brahner, Ingolstadt (DE); Ingo Ledendecker, Buxheim (DE); Stephan Maas, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/418,627

(22) PCT Filed: Jul. 10, 2013

(86) PCT No.: PCT/EP2013/002027
§ 371 (c)(1),
(2) Date: Jan. 30, 2015

(87) PCT Pub. No.: WO2014/023384
PCT Pub. Date: Feb. 13, 2014

(65) Prior Publication Data
US 2015/0156010 A1   Jun. 4, 2015

(30) Foreign Application Priority Data

Aug. 10, 2012  (DE) .................. 10 2012 015 940

(51) Int. Cl.
*B60R 25/04*  (2013.01)
*H04L 9/00*  (2006.01)
*F02N 15/00*  (2006.01)

(52) U.S. Cl.
CPC . *H04L 9/00* (2013.01); *B60R 25/04* (2013.01); *F02N 15/00* (2013.01)

(58) Field of Classification Search
CPC .... B60R 25/04; B60R 25/0415; B60R 25/24; B60R 25/241
USPC ................... 701/101; 307/10.1–10.5
See application file for complete search history.

(56) References Cited

U.S. PATENT DOCUMENTS 6,144,927 A * 11/2000 Grill ..................... H04L 63/123
342/386
6,181,026 B1 * 1/2001 Treharne ............... B60R 25/043
307/10.1

(Continued)

FOREIGN PATENT DOCUMENTS

DE          10213658        10/2003
DE        102005039585       2/2007

(Continued)

OTHER PUBLICATIONS

WIPO provided English language translation of the International Preliminary Report on Patentability mailed Feb. 12, 2015 for corresponding International Patent Application No. PCT/EP2013/002027.

(Continued)

*Primary Examiner* — Thomas Moulis
(74) *Attorney, Agent, or Firm* — Staas & Halsey LLP

(57) ABSTRACT

In a method for operating a motor vehicle, encrypted data is exchanged between a sensor and a control device via a bus. An item of information required for decrypting the exchanged data is provided by a user of the motor vehicle by way of a portable device. The encrypted data includes measurement values of the sensor which relate to an operating state of a component of the motor vehicle.

13 Claims, 1 Drawing Sheet

(56) References Cited

U.S. PATENT DOCUMENTS

| | | | |
|---|---|---|---|
| 7,402,920 B2 * | 7/2008 | Kamiya | B60R 25/02153 307/10.6 |
| 7,411,481 B2 * | 8/2008 | Yamamoto | B60R 25/04 307/10.2 |
| 7,581,521 B2 | 9/2009 | Gietzen et al. | |
| 8,035,494 B2 | 10/2011 | Waldmann et al. | |
| 8,166,303 B2 | 4/2012 | Fischer et al. | |
| 8,725,312 B2 * | 5/2014 | Mori | G07C 5/0808 701/1 |
| 9,127,610 B2 * | 9/2015 | Smith | F02D 41/22 |

FOREIGN PATENT DOCUMENTS

| | | |
|---|---|---|
| DE | 102007022100 | 11/2008 |
| DE | 102010044722 | 3/2012 |
| DE | 102012015940.4 | 8/2012 |
| EP | 0682609 | 1/1997 |
| EP | 2466848 | 6/2012 |
| FR | 2687626 | 8/1993 |
| WO | 2007/019955 | 2/2007 |
| WO | 2010/102728 | 9/2010 |
| WO | PCT/EP2013/002027 | 7/2013 |

OTHER PUBLICATIONS

German Office Action for German Priority Patent Application No. 10 2012 015 940.4, issued May 8, 2013, 4 pages.

English Language International Search Report for PCT/EP2013/002027, mailed Sep. 27, 2013, 3 pages.

* cited by examiner

MOTOR VEHICLE WITH ENCRYPTED BUS DATA

CROSS REFERENCE TO RELATED APPLICATIONS

This application is based on and hereby claims priority to International Application No. PCT/EP2013/002027 filed on Jul. 10, 2013 and German Application No. 10 2012 015 940.4 filed on Aug. 10, 2012, the contents of which are hereby incorporated by reference.

BACKGROUND

The invention relates to a method for operating a motor vehicle.

In order to increase theft prevention in modern motor vehicles, electronic immobilizers are a legal requirement. Such immobilizers comprise a portable part, for example a vehicle key, in which a piece of cryptographic information is stored and can be transmitted to further electronic components of the motor vehicle by a transponder, for example. One of these further components, usually an engine controller, stores a further piece of cryptographic information. Only if the piece of information transmitted by the portable component is compatible with the piece of information stored in the motor vehicle is it possible to start the motor vehicle.

Such immobilizers can be overcome by changing the engine controller and replacing it with a new one that is compatible with a key having prescribed cryptographic information.

In order to provide improved security, DE 10 2010 044 722 A1 proposes the use of a piece of physically coded cryptographic information in the vehicle. By way of example, this is accomplished by casting metal particles in a stochastic distribution in plastic and measuring a physical property, which is dependent on the distribution of the metal particles, and using this measured value as cryptographic information. In order to prevent simple bypassing, the sensor measured value is encrypted by a communication key in this process.

Such immobilizers are also susceptible to physical access, however, since the relevant controllers are relatively easy to change.

SUMMARY

It is therefore one possible object to provide a method for operating a motor vehicle that ensures improved theft prevention.

The inventors propose a method for operating a motor vehicle, in which encrypted data are interchanged between a sensor and a controller via a bus, wherein a piece of information that is necessary for decrypting the interchanged data is provided by a user of the motor vehicle by a portable apparatus.

According to the proposed method, the encrypted data then comprise measured values from the sensor that relate to an operating state of a component of the motor vehicle.

In contrast to the known related art, the encrypted data are therefore not prescribed statically and independent of operation of the motor vehicle. The use of operationally relevant sensor data protects the motor vehicle against illegal access and modifications not only when starting but also throughout operation and also makes cryptographic attacks difficult on account of the dynamic nature of the transmitted data, which means that a particularly secure immobilizer is provided.

It is particularly expedient for the sensor used to be a crankshaft angle sensor or a camshaft angle sensor. In contrast to the engine controller, it is extremely complex to change such sensors and doing so necessitates dismantling of the entire engine and/or transmission. This provides additional protection against physical attacks on the immobilizer.

In order to protect against further cryptographic attacks that utilize repeated patterns in the sensor signal, for example, it is advantageous for the measured values from the sensor to be encrypted together with at least one further piece of information, selected from a serial number of the sensor, a timer signal and/or a random number. In this way, it is possible to mask periodicities that could lead to cryptographic vulnerabilities.

In a particularly preferred embodiment, all data interchanged between components coupled to the bus are encrypted. This realizes a particularly secure immobilizer, since no kind of bus communication can be decrypted provided that the portable apparatus of the driver, for example the vehicle key, does not provide the correct piece of cryptographic information for decryption. Bypassing such a system by changing components is extremely complex, since many important electronic parts of the motor vehicle would need to be exchanged in order to allow the motor vehicle to be operated using a non-authentic key.

Preferably, in addition, at least one piece of information that is necessary for controlling a unit of the motor vehicle is stored in a manner distributed over a plurality of components coupled to the bus. Such distributed storage of the information, which is accessible only following correct decryption, makes it even more difficult for unauthorized parties to establish what manipulations they would need to perform in order to gain access to the motor vehicle.

This is the case particularly if the components over which the piece of information is stored in a distributed manner are selected at random. A further increase in security can be attained by virtue of the components over which the piece of information is stored in a distributed manner being reselected when prescribed conditions arise. By way of example, the pieces of information can be redistributed whenever the motor vehicle is parked, which means that it is unpredictable what components are needed for starting the motor vehicle the next time.

Preferably, a symmetric encryption algorithm that is known to be secure, particularly an AES algorithm, is used for encryption. The AES method provides good cryptographic security given relatively low computation complexity. In particular, the use of an AES key with a key length of at least 128 bits is expedient.

The inventors also propose a motor vehicle having at least one component that is coupled to a bus and that is designed to carry out a method of the type described above. This design relates particularly to the computation capacity of the controls used, which need to be equipped with sufficient power to perform cryptographic operations.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
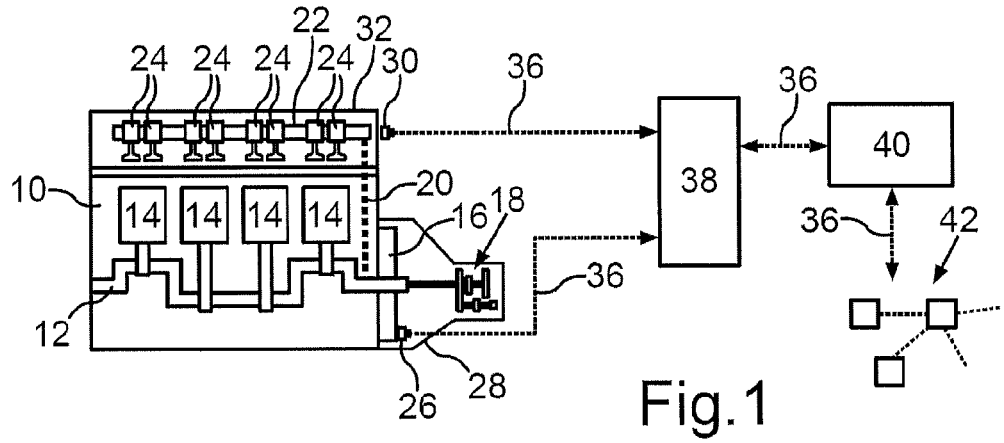
FIG. 1 shows a schematic illustration of a motor vehicle engine with associated sensors and controllers.
Figure 2:
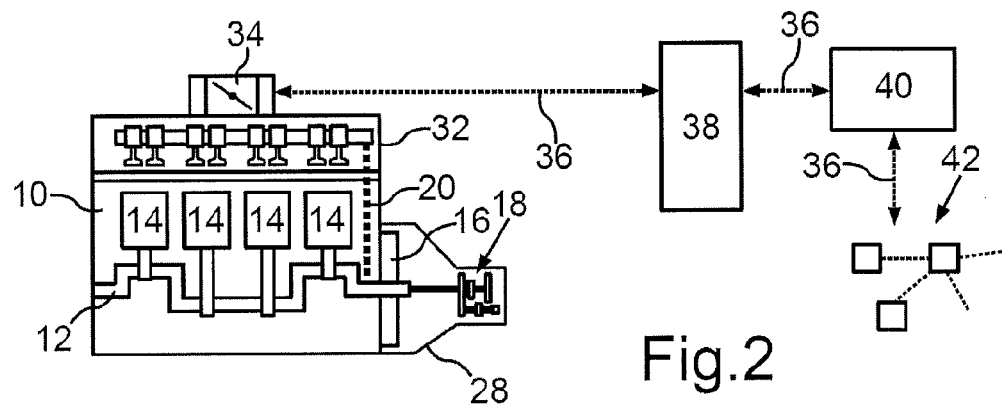
FIG. 2 shows a schematic illustration of a motor vehicle engine with associated actuators and controllers.

Reference will now be made in detail to the preferred embodiments of the present invention, examples of which are illustrated in the accompanying drawings, wherein like reference numerals refer to like elements throughout.

An engine 10 of a motor vehicle comprises a crankshaft 12 that converts the translational movement of the pistons 14 into a rotational movement. A flywheel 16 couples the crankshaft 12 to a transmission 18. A positive-locking transmission element 20, for example a chain, a toothed belt or a gearwheel arrangement, couples the crankshaft 12 to a camshaft 22 that mechanically actuates the valves 24 of the engine 10 that are associated with respective cylinders of the engine 10.

Actuating the engine 10 requires precise knowledge of the rotational position of the crankshaft 12 and the camshaft 22, so that the respective ignition instant for individual cylinders can be set in optimum fashion, for example. For this purpose, a crankshaft sensor 26, which is arranged inside a transmission housing 28, and a camshaft sensor 30, which is arranged inside a cylinder head 32, are provided. In addition, an electrical throttle valve regulator 34 is provided for actuation in order to be able to regulate the amount of air and fuel that enters the cylinders.

The sensors 26 and 30 and the throttle valve regulator 34 use bus connections 36 to communicate with an engine controller 38 connected, which in turn uses a gateway 40 to communicate with a CAN bus of the motor vehicle.

Figure 3:
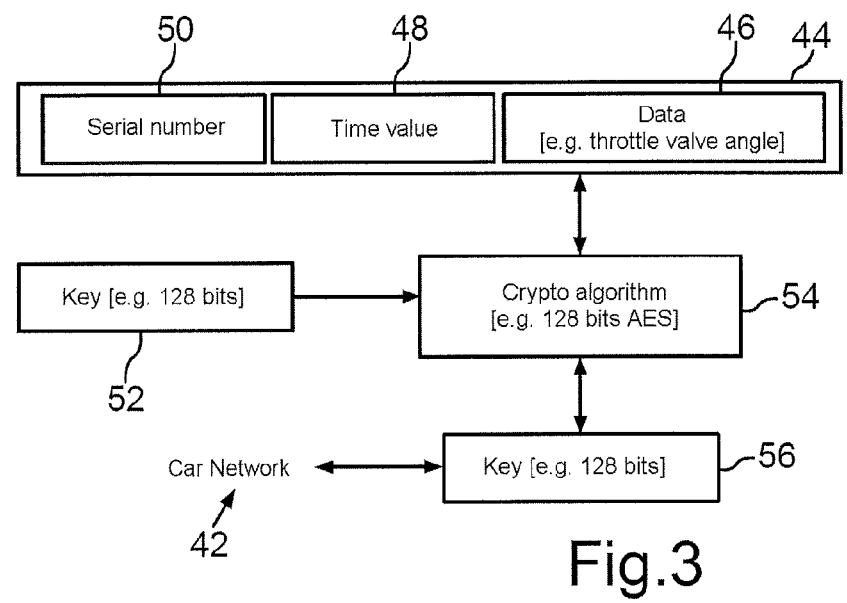
FIG. 3 shows a schematic illustration of an encrypted data structure for secure communication via a motor vehicle bus.

In order to allow secure communication between the devices connected to the bus 42 and at the same time to realize an immobilizer function, the entire bus communication is encrypted. FIG. 3 shows an example of the structure of a data packet 44 in the bus communication. The data packet 44 comprises the actual data 46 to be transmitted, for example a measured value from the sensors 26, 30 or a control angle for the throttle valve regulator 34. These data 46 are bundled together with a timer value 48 and a serial number 50 of the sending device to form the data packet 44. This bundling firstly allows explicit association with a particular device and sending instant but secondly also makes decryption of the data packet 44 by unauthorized parties more difficult, since periodicities in the data 46 that would allow a cryptographic attack are masked by the information 48 and 50, for example.

A 128-bit key 52 is used to encrypt the data packet 44 by an AES algorithm 54 before it is transmitted to the bus 42 in accordance with the requirements of the transport protocol 56. Alternatively, it is also possible to use other symmetric encryption algorithms that are known to be secure.

So that this encryption can simultaneously realize an immobilizer function, the other bus subscribers do not themselves have the necessary information for decrypting the data packet 44. Instead, this information is provided by a portable apparatus, for example a transponder integrated in a vehicle key. Only if the driver of the motor vehicle is able to authenticate himself using this apparatus is bus communication actually possible.

In contrast to conventional immobilizers, which can often be overcome by simply changing the engine controller 38, the system described is protected against physical attacks, since the encryption of the entire bus communication means that every single controller would need to be exchanged in order to match it to a piece of unauthenticated cryptographic information in a forged vehicle key. This is possible only with difficulty, particularly in the case of inaccessibly installed parts such as the sensors 26, 30.

In contrast to conventional immobilizers, the protection additionally relates not only to the starting process itself but also to the entire operation of the motor vehicle. Tow starting or another externally driven starting process can therefore be efficiently prevented.

In order to provide additional security, further information that is necessary for the operation of the motor vehicle can be stored in a manner distributed over a plurality of bus subscribers. Particularly if this distribution pattern changes, unauthorized attackers have very little opportunity to identify points of attack at all.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for operating a motor vehicle, comprising:
   obtaining measured values from a sensor that relate to an operating state of a component of the motor vehicle;
   encrypting the measured values from the sensor to produce encrypted data, the measured values from the sensor being encrypted together with at least one piece of information selected from a timer signal and a random number, in a manner bundled to form a data packet;
   interchanging the encrypted data between the sensor and a controller via a bus; and
   receiving a piece of information that is necessary for decrypting the encrypted data, the piece of information being received from a user of the motor vehicle via a portable apparatus.

2. The method as claimed in claim 1, wherein
   the sensor is a crankshaft angle sensor or a camshaft angle sensor.

3. The method as claimed in claim 2, wherein
   the controller is an engine control unit, and
   ignition timing for each of the cylinders is determined based on at least one of the crankshaft angle and the camshaft angle.

4. The method as claimed in claim 1, wherein
   a plurality of components are coupled to the bus, and
   all data interchanged between components coupled to the bus are encrypted.

5. The method as claimed in claim 4, wherein all data interchange between components coupled to the bus are encrypted using a key received from the user of the motor vehicle via the portable apparatus.

6. The method as claimed in claim 4, wherein
   a required information item that is necessary for controlling a unit of the motor vehicle is stored in a manner distributed over at least two components coupled to the bus.

7. The method as claimed in claim 6, wherein
   the at least two components over which the required information item is stored are selected at random.

8. The method as claimed in claim 7, wherein
   the at least two components over which the required information item is stored are reselected when prescribed conditions arise.

9. The method as claimed in claim 1, wherein
   a symmetric encryption algorithm is used for encryption.

10. The method as claimed in claim 1, wherein
an Advanced Encryption Standard (AES) symmetric encryption algorithm is used for encryption.

11. The method as claimed in claim 10, wherein the AES symmetric encryption algorithm uses a key length of at least 128 bits.

12. The method as claimed in claim 1, wherein the portable apparatus is a vehicle key.

13. A motor vehicle comprising:
a sensor to obtain measured values that relate to an operating state of a component of the motor vehicle;
a device to encrypt the measured values from the sensor to produce encrypted data, the measured values from the sensor being encrypted together with at least one piece of information selected from a timer signal and a random number, in a manner bundled to form a data packet; and
a controller coupled to the sensor via a bus to receive the encrypted data from the sensor and to receive a piece of information that is necessary for decrypting the encrypted data, the piece of information being received from a user of the motor vehicle via a portable apparatus.

* * * * *